US006545691B1

(12) United States Patent
Vallejo

(10) Patent No.: US 6,545,691 B1
(45) Date of Patent: *Apr. 8, 2003

(54) CLIENT-SIDE CONTROL OF CONTROLS LOADED BY A BROWSER

(75) Inventor: Daniel M. Vallejo, Bellevue, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 291 days.

(21) Appl. No.: 09/096,680

(22) Filed: Jun. 12, 1998

(51) Int. Cl.[7] .................................................. G09G 5/00
(52) U.S. Cl. ....................... 345/804; 709/328; 709/329; 345/744
(58) Field of Search ................................. 345/340, 333, 345/354, 357, 334, 335, 347, 356, 804, 744; 707/513, 522, 514; 395/680, 701; 709/328, 329

(56) References Cited

U.S. PATENT DOCUMENTS

| 5,553,282 A | * | 9/1996  | Parrish et al. | ............... 395/600    |
| 5,581,684 A | * | 12/1996 | Dudzik et al.  | ............... 395/338    |
| 5,815,712 A | * | 9/1998  | Bristor et al. | ............... 395/701    |
| 5,838,906 A | * | 11/1998 | Doyle et al.   | ............ 395/200.32    |
| 5,860,073 A | * | 1/1999  | Ferrel et al.  | ............... 707/522    |
| 5,889,522 A | * | 3/1999  | Chew et al.    | ............... 345/354    |
| 5,903,269 A | * | 5/1999  | Poreh et al.   | ............... 345/346    |
| 5,995,756 A | * | 11/1999 | Herrmann       | ............... 395/712    |
| 5,999,972 A | * | 12/1999 | Gish           | ............... 709/219    |
| 6,101,510 A | * | 8/2000  | Stone et al.   | ............... 707/513    |

* cited by examiner

Primary Examiner—Raymond J. Bayerl
Assistant Examiner—Tadesse Hailu
(74) Attorney, Agent, or Firm—Michalik & Wylie, PLLC

(57) ABSTRACT

A method and system that allows client code such as drawing code to remain in the client application yet allows the drawing code to be used in a control such as an ActiveX® control. A page including the control is created at a client window, and the client instructs a browser to render the page, whereby the control is instantiated. The control is provided with a handle to the client window, and using the handle, walks up the chain of its parent windows sending messages to locate the client window. Via the message, when the client window is located, the control sends its control window handle to the client window, whereby the client window is able to subclass the control window. The client is then able to perform operations in the control window such as draw reports, charts, graphs and the like therein.

24 Claims, 6 Drawing Sheets

CLIENT-SIDE CONTROL OF CONTROLS LOADED BY A BROWSER

FIELD OF THE INVENTION

The invention relates generally to computer systems, and more particularly to outputting information such as via HTML pages on a computer system.

BACKGROUND OF THE INVENTION

Contemporary applications are migrating toward embedding HTML (hypertext mark-up language) therein, so that at least some of their output, such as charts, graphs and reports, may be drawn via HTML pages. To this end, a client application places its drawing and printing code into ActiveX® controls, and then creates one or more HTML pages specifying those ActiveX® controls. When a browser or the like renders the page, the ActiveX® code is instantiated, and, for example, draws the desired report and/or chart. As can be readily appreciated, the use of HTML pages enables page designers and the like to develop pages via familiar, user-friendly editing mechanisms independent from the code that actually determines the output and draws the display.

However, many existing applications (e.g., Microsoft® Money 97) were not developed to provide their output via HTML pages. Instead, these programs typically comprise a large executable file that includes the drawing (and printing) code therein for outputting charts, reports and so on. Such drawing code is tightly integrated into the application, and thus there is no straightforward way in which to move the report and chart drawing code into ActiveX® controls so that the code may be used in an HTML page. Because of the drawing code's deep integration into the rest of the code, not only would moving the drawing code into ActiveX® controls be a formidable and labor-intensive task, but would likely result in code that was filled with bugs, if indeed such code worked at all.

SUMMARY OF THE INVENTION

Briefly, the present invention provides a method and system that allows client code such as drawing code to remain in the client application yet allows the code to be used in a control such as an ActiveX® control, thereby enabling existing applications to provide output via HTML pages. To this end, a page including the control is created at a client window, and the client instructs a page rendering mechanism such as a browser to render the page, whereby the control is instantiated. The control is provided with a handle to the client window, and, using the handle, the control walks up the chain of its parent windows sending messages to locate the client window. Via the message, when the correct client window is located, the control sends its control window handle to the client window, whereby the client window is able to subclass the control window. The client is then able to perform operations in the control's window, such as to draw reports, charts, graphs and the like therein.

Other advantages will become apparent from the following detailed description when taken in conjunction with the drawings, in which:

DETAILED DESCRIPTION OF THE PREFERRED EMBODIMENT

Exemplary Operating Environment

Figure 1:
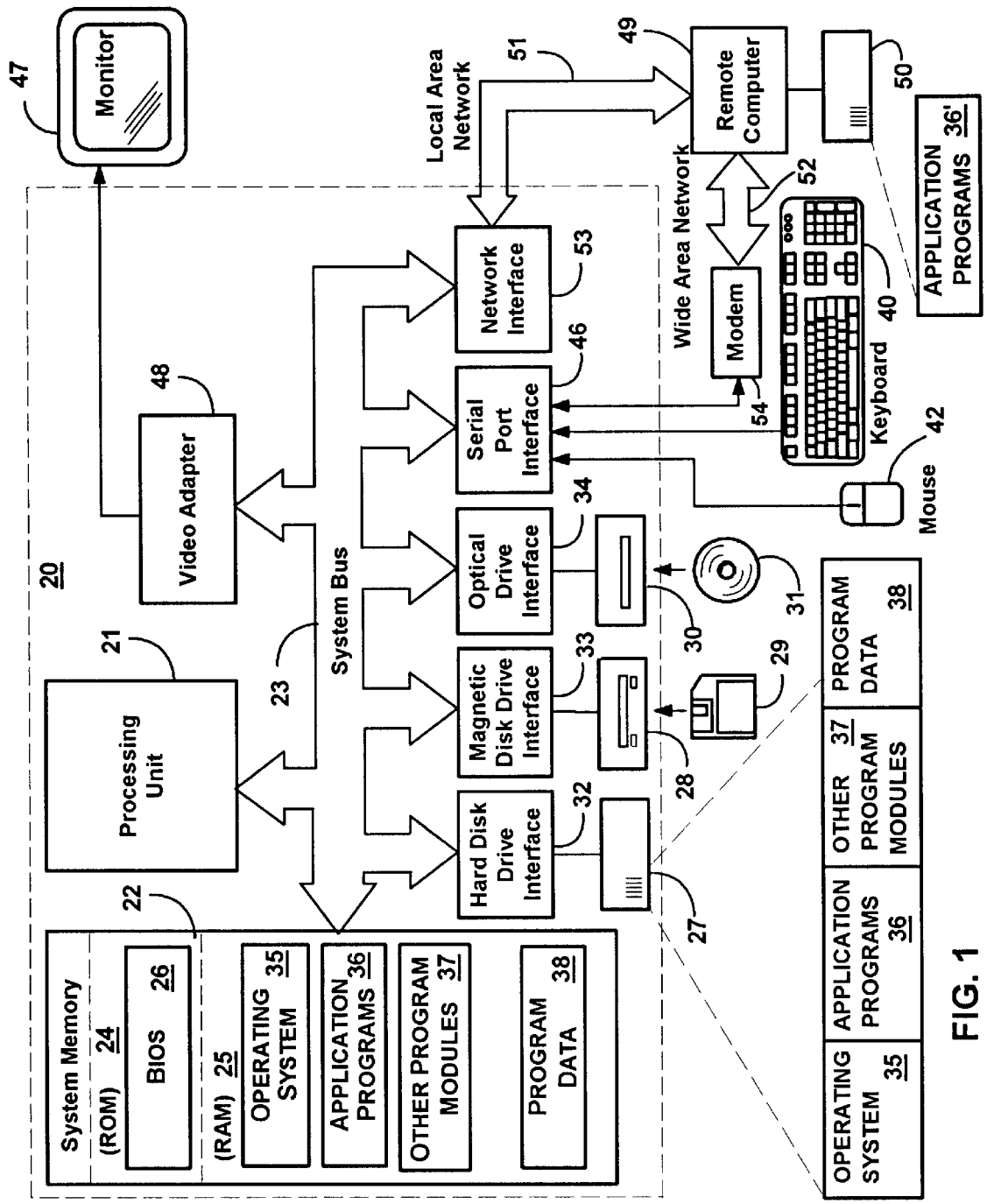
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (including a file system therein and/or associated therewith), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device.

It will be appreciated that the network connections shown are exemplary and other means of establishing a communications link between the computers may be used.

CLIENT SIDE CONTROL OF ACTIVEX CONTROLS

In general, the present invention provides a method and system by which a client-side application 60 (FIG. 2) takes over control of one or more ActiveX® controls (e.g., $62_1$–$62_3$) or equivalents thereof. For example, a control (e.g., $62_3$) basically allows client drawing code 64 to draw inside of it, and yet do so while the control $62_3$ is being hosted by an HTML browser control 66. Since the browser control 66 knows how to work with such ActiveX® controls, the present invention enables the existing drawing code 64 or the like to remain in the application program 60, yet produce output via HTML pages displayed by web browsers. Although the preferred control is actually an ActiveX® control, because its primary purpose is to provide a window for other code to subclass, at times herein the control is somewhat conveniently referred to as a "PassiveX" control.

Figure 2:
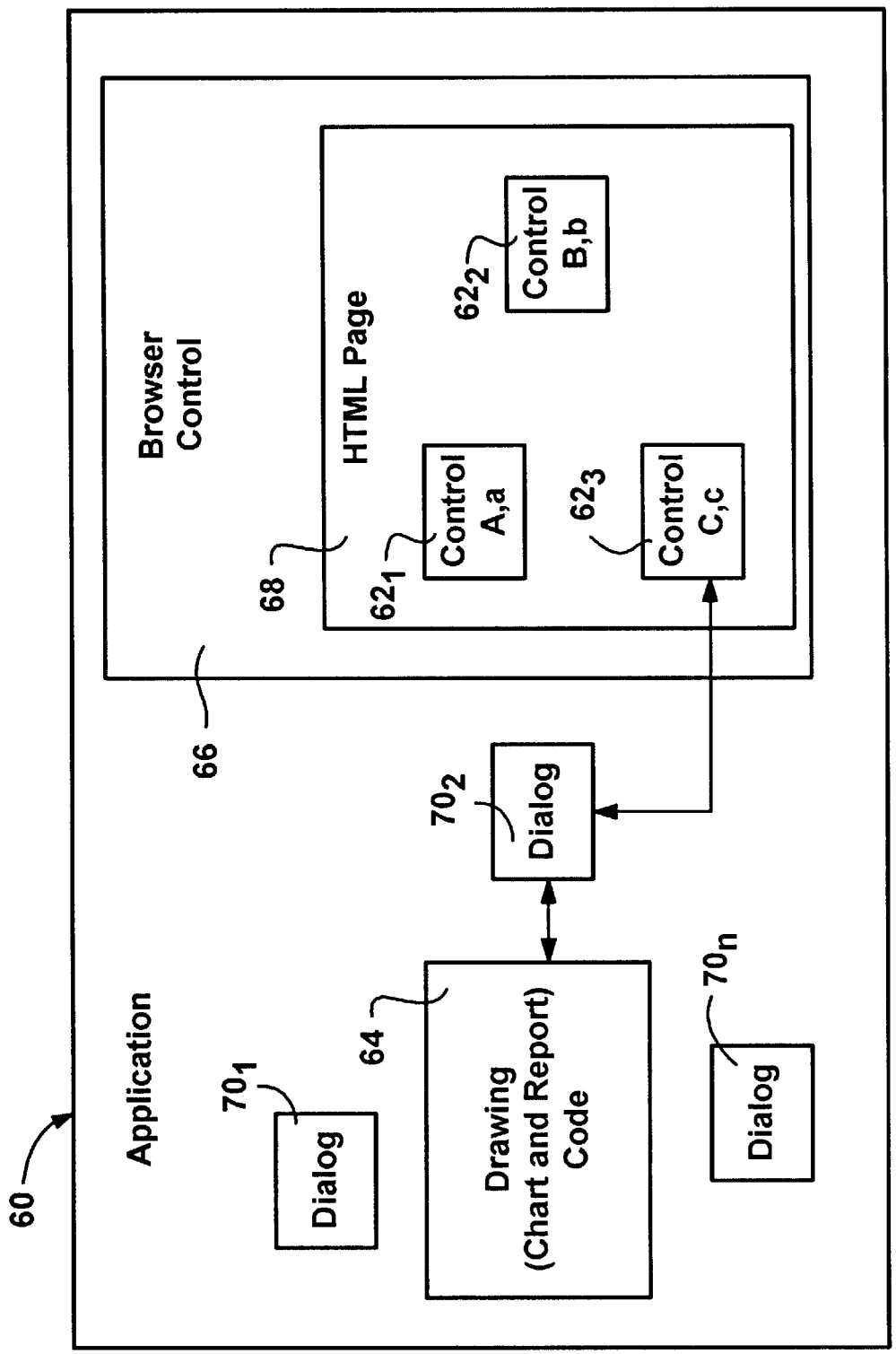
FIG. 2 is a block diagram representing a general conceptual model of components constructed in accordance with one aspect of the present invention.

As shown in FIG. 2, an application 60 creates one or more windows in the form of dialog boxes $70_1$–$70_n$. Although not necessary to the invention, the present invention was originally developed for use with the Microsoft® Money application program, which uses dialog boxes $70_1$–$70_n$ for the client-side operations described herein. As such, the present invention will be described with reference to dialog boxes, however it is understood that the invention may be implemented in virtually any application program having at least one window capable of exchanging messages with other windows. In general, the passing of windows messages and the mechanism therefor are well-known, and thus are not described herein in detail, (see, e.g.,"Programming Windows 95," Charles Petzold, Microsoft Press [1996]) herein incorporated by reference in its entirety. Moreover, although the present invention is described as using a browser control to display an HTML page, it is understood that the invention will operate with virtually any page rendering mechanism capable of rendering output from an HTML page or the like.

Figure 3:
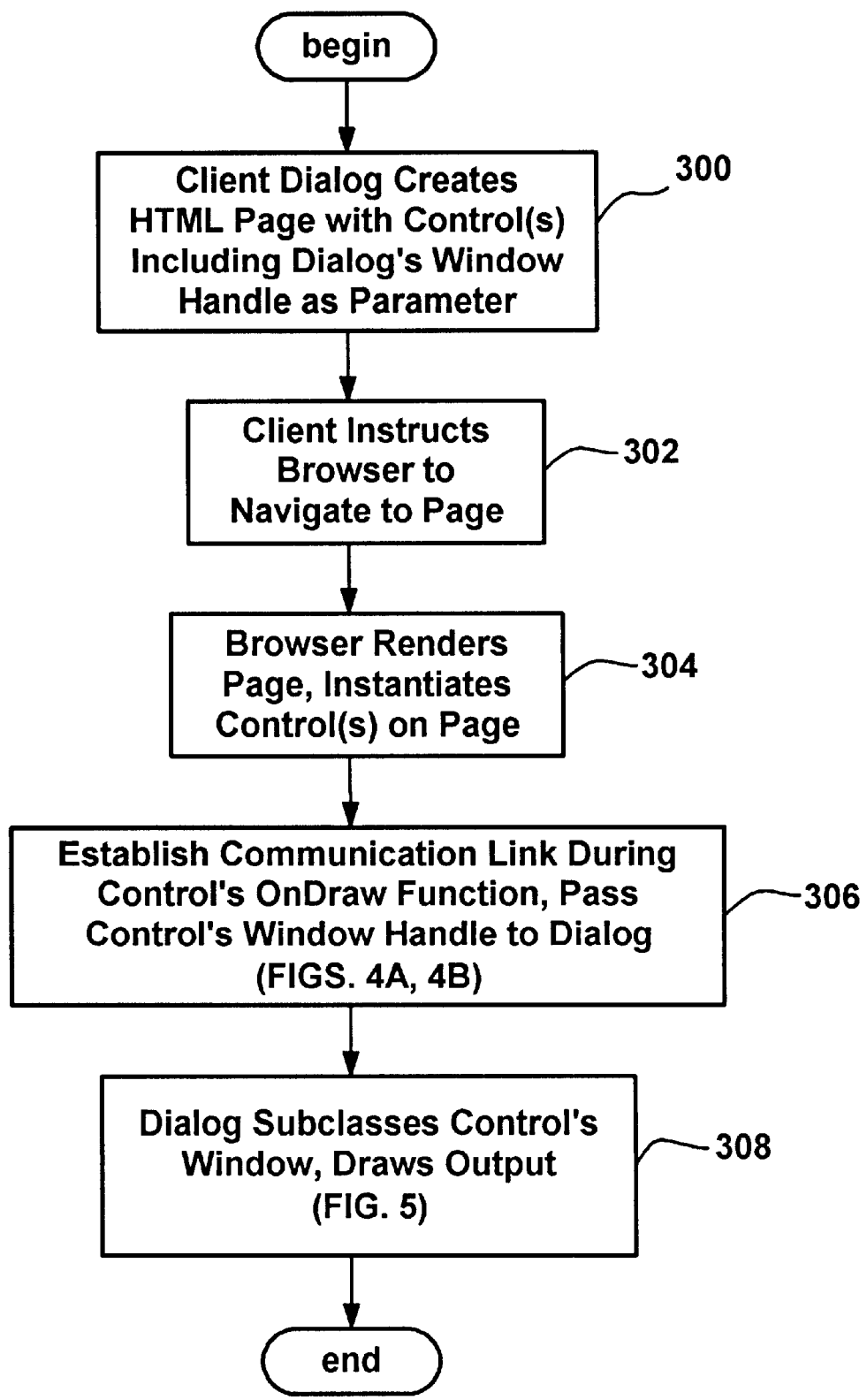
FIG. 3 is a flow diagram generally representing the flow of control between various components in accordance with one aspect of the present invention.

FIG. 3 represents the general flow of operation of the present invention, beginning at step 300, wherein a dialog box (e.g., $70_2$) creates an HTML page 68, such as for the ultimate purpose of displaying a report or the like. Although shown in FIG. 2, it is understood that the HTML page 68 is not visible until displayed by an appropriate browser control 66 or the like. Such HTML pages are well known, and may include formatted text, graphics, images and so on. However, the appearance of reports, charts, graphs and the like vary according to an application's current data, and to be useful for providing dynamically generated charts, the HTML page 68 is ordinarily not entirely static.

Thus, in accordance with one aspect of the present invention, the HTML page created by the dialog $70_2$ includes one or more "PassiveX" controls (e.g., $62_1$–$62_3$ of FIG. 2) so as to be able to dynamically provide appropriate output. To use a PassiveX control, the client (dialog box $70_2$) creates an HTML page 68 such as with the following object tag:

```
<Object classid="clsid:20EE29F8-7550-11D0-884D-00A0C9034896" height=%d width=%d>
    <name="ReportType" value="%d">
    <name="ReportSub" value="%d">
    <param name="hwndClient" value="%ld">
</object>
```

The class identifier is preferably that of the application program, shown herein for exemplary purposes as the classid of Microsoft® Money. Because one application creates the page, the classid is the same for any of the controls on the page 68. Thus, since there may be multiple controls (e.g., $62_1$–$62_3$) on the same page 68, in addition to the height and width parameters,"ReportType" and"Report- Sub" parameters are provided to uniquely identify (per that page) each control (e.g., $62_3$) on that page. Also, to enable the control $62_3$ to communicate with the dialog box $70_2$ as described below, the dialog box $70_2$ provides its window handle as a parameter to the control $62_3$.

At step 302 of FIG. 3, the client then instructs the browser control 66 to navigate to that page 68, whereby at step 304 the browser 66 renders the page 68 thereby instantiating any controls on that page 68. Note that starting and/or directing a browser from within an application are well known operations, as is the browser's navigating to a page, and thus for purposes of simplicity these operations are not described in detail herein.

Figure 4A:
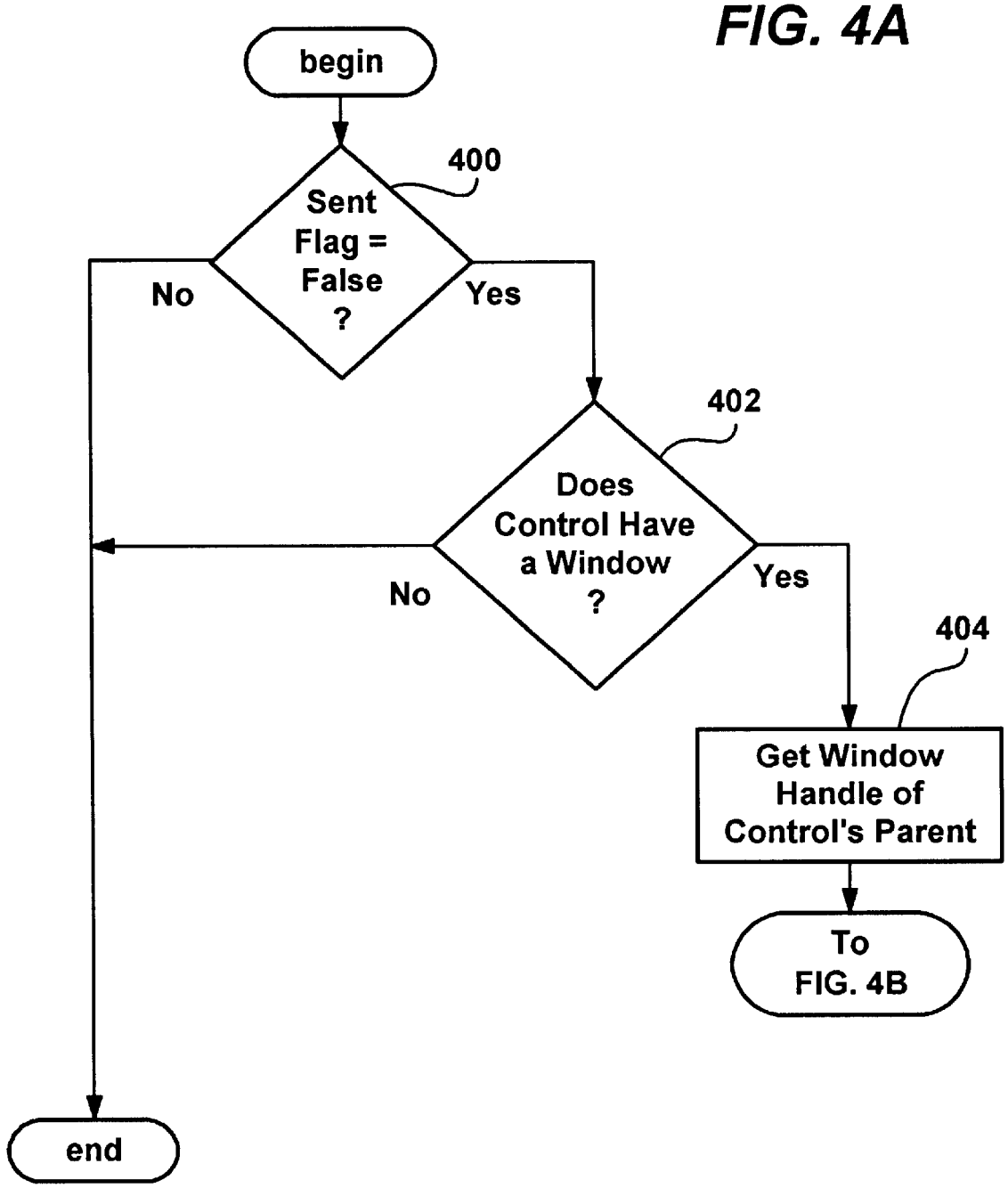
FIGS. 4A and 4B comprise a flow diagram generally representing the steps taken by a control to send a message to a client window in accordance with one aspect of the present invention.
Figure 4B:
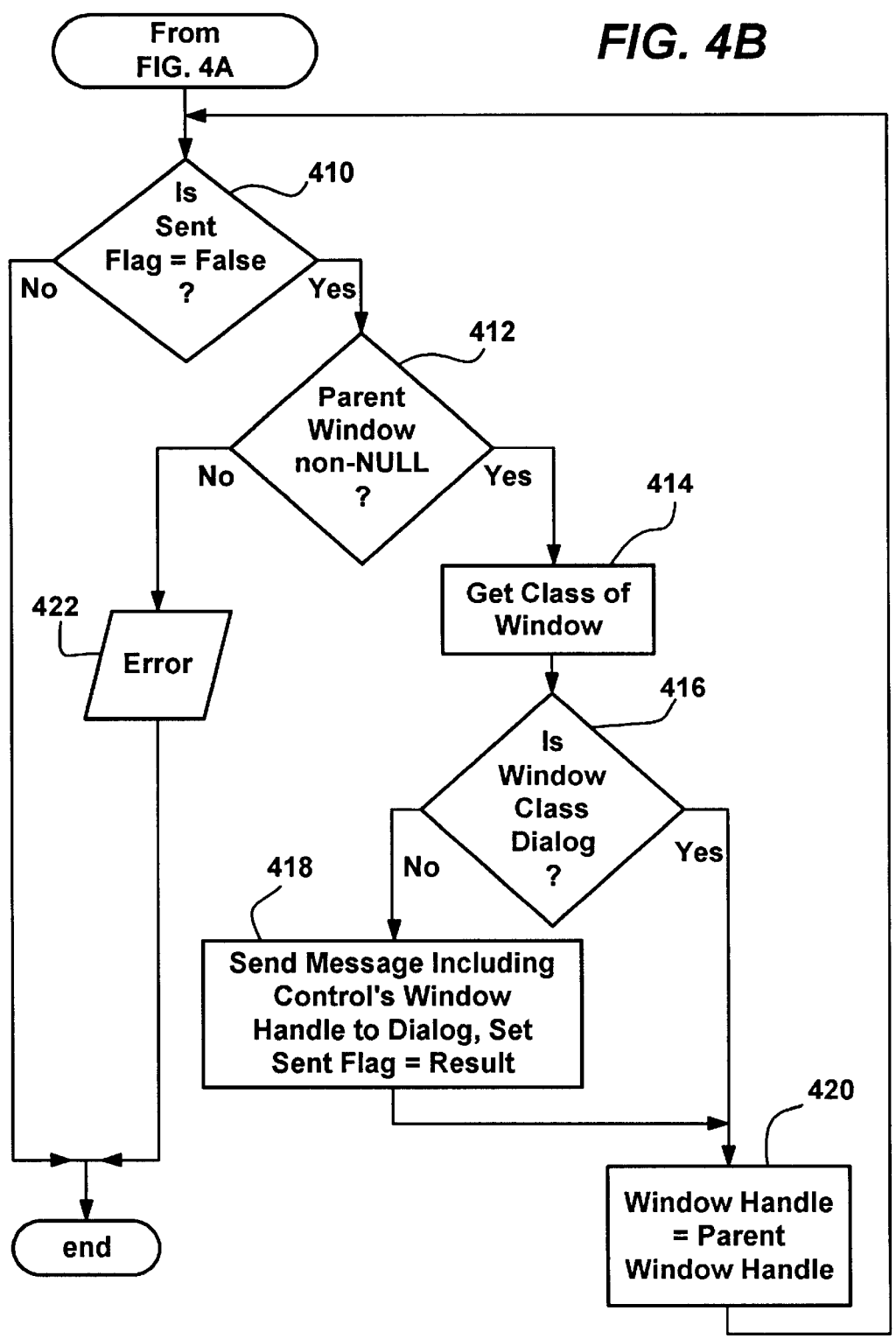

As represented in step 306, when the "PassiveX" control (e.g., $62_3$) is instantiated, the control $62_3$ attempts to establish a communication to the client window $70_2$. However, the control's window is owned by its parent window, i.e., the browser's window, which in turn may be owned by another window, and so on, up until the client's dialog window $70_2$. Thus, to locate the appropriate window, (in this example the dialog box $70_2$), the control $62_3$ walks up the chain of its parent windows, sending a message to each of the windows until it achieves a successful result, (or an error if communication has not been established and no parent windows remain). The control's code (OnDraw), and the function that walks up the parent chain sending messages (FirePassiveX) are shown below:

OnDraw:

The FirePassiveX function is also described herein in detail with respect to FIGS. 4A and 4B, with reference to the exemplary components shown in FIG. 2. As is understood, FIGS. 4A and 4B are provided herein to more clearly illustrate the general logic of the FirePassiveX function, and thus are not as detailed as the above code. As such, FIGS. 4A and 4B are only intended to be a general guide to the above code, with the code itself being an actual implementation of the function.

As shown beginning at step 400 of FIG. 4A, a "Sent" flag (default value equals "False") is tested to see if this control $62_3$ has already established communication with the dialog window $70_2$, in which event the flag would be "True" and the function would end. For purposes of the present example, at this time communication has not been established, and thus the FirePassiveX function branches to step 402. Step 402 tests to determine if the control $68_3$ has a window, i.e., its window handle is not NULL. Note that steps 400–402 are preliminary steps taken to ensure that a message needs to be sent to establish communication and that the control has a window. If the window handle of the control $62_3$ is not NULL, step 404 is executed, which obtains the handle to the parent window of the control using the GetParent () function, ordinarily the browser's window handle. The FirePassiveX function then continues to step 410 of FIG. 4B.

At step 410 (FIG. 4B), the Sent flag is again tested as part of a "Do while" loop that detects when communication to the client window is established. At this time, the Sent flag

```
void CmnyrptCtrl::OnDraw(CDC* pdc, const CRect& rcBounds, const CRect& rcInvalid)
    {
    static BOOL fInOnDraw = FALSE;
    // Avoid recursive calls to OnDraw
    if (fInOnDraw)
        {
        return;
        }
    fInOnDraw = TRUE;
    FirePassiveX(MAKEWPARAM(m_sReportType, m_sReportSub), (LPARAM)m_hWnd);
    FInOnDraw = FALSE,
    }
```

FirePassiveX:

```
void CMnyrptCtrl::FirePassiveX(WPARAM wParam, LPARAM lParam)
    {
        const TCHAR tsZDialog[ ] = T("#32770");
        // Send the WM_PASSIVEX message if (a) it needs to be sent, and (b)
        // we have a window. (Otherwise GetParent( ) will fail!)
        if(!m_fSent&&m_hWnd != NULL)
            {
            TCHAR tszWndClassName[countof(tsZDialog)+100];
            HWND hwnd = ::GetParent(m_hWnd);
            while (!m_fSent && (hwnd != NULL))
                {
                ::GetClassName(hwnd, tszWndClassName, countof(tszWndClassName));
                if (_tcscmp(tszWndClassName, tsZDialog) == 0)
                    {
                    m_fSent = ::SendMessage(hwnd, WM_3PASSIVEX, wParam, lParam);
                    }
                hwnd =::GetParent(hwnd);
                }
            ASSERT(m_fSent);
            }
    }
``` is still false, and thus step 412 is executed to determine if the top of the parent chain has been reached. In the present example, the control's parent window is the browser control 66, which has a non-NULL handle, and thus step 412 branches to step 414. Note that an error message or the like would be generated at step 422 if no communication was established and the top of the window parent chain was reached.

In the present implementation, the control 70₂ knows that the parent window that it is seeking is eventually going to be a dialog box. As such, steps 414 and 416 are provided as an optimization to bypass the step of sending a message to any non-dialog boxes in the chain of parents. To this end, step 414 gets the class of the parent window while step 416 tests this class to determine if it is a dialog window class, a known constant value. If not, no message is sent at step 418 (described below) and the function continues to step 420 which gets the window handle of the next parent up the chain before looping back to step 410.

If a dialog box is recognized, a windows message is sent to that dialog box using the window handle of the current parent in the chain. In the message, the FirePassiveX function passes back the information that was setup by the client, (height, width, "ReportType" and "ReportSub") plus the PassiveX control's window handle. The control's window handle will be used by the client to take over drawing in the control's window, whereby by taking over the drawing of the PassiveX control, the drawing code 64 is contained in the client 60 rather than in the control 62₃. Also passed with the windows message is a special hardcoded value for handshaking purposes, WM₁₃ PASSIVEX. The actual value of WM₁₃ PASSIVEX is not significant, as long as it is known to both the client and the control and is a number that is unlikely to be randomly generated. One implementation using the following values:

```
#define WM_BARNBASE    (WM_APP+1)
#define WM_PASSIVEX    (WM_BARNBASE+40)   //Communication between PassiveX controls
                                          and CMonthlyReport Place
```

Similarly on destruction of the PassiveX control, e.g., when the html page goes away, the client may need to do some cleanup work. At that time, the PassiveX control sends a WM₁₃ PASSIVEX message, also with special parameters:

```
#define PASSIVEX_DESTROY_TYPE    123
#define PASSIVEX_DESTROY_SUB     456
void CMnyrptCtrl::OnDestroy( )
{
    if(m__hWnd != NULL)
        {
        ASSERT(m__hwndClient != NULL);
        ::SendMessage(m__hwndClient, WM_PASSIVEX,
        MAKEWPARAM(PASSIVEX_DESTROY_TYPE, PASSIVEX_DESTROY_SUB),
            (LPARAM)m__hWnd);
        }
}
```

Note that the hardcoded values used for establishing communication are static, however it is alternatively feasible to implement a dynamic mechanism for this purpose, such as by using registered messages.

Lastly, as described below, if communication with the correct dialog 70₂ is established, a "True" result is returned, whereby at step 418, the Sent flag is set to the result of the message, i.e., "True" in the present example if the message was sent to the dialog box 70₂, otherwise "False." Step 420 is then executed to get the parent window handle, i.e., move up the chain, as described above.

After step 420, the process loops back to step 410, wherein if the message did find the appropriate dialog box 70₂, the Sent flag is True, communication is established and the FirePassiveX function ends. If the Sent flag is False at step 410, the process repeats using the new parent window as the current parent window, so long as a parent window exists that needs to be tested (as determined by step 412). In this manner, an instantiated control locates the correct client window, e.g., the dialog box 70₂, and provides that window with the window handle to the control.

Turning to an explanation of the client side operation, when the client window receives a $WM_{13}$ PASSIVEX message (via the above-described step 418), the client needs to receive and process that message, which it does by first setting up a message map as set forth below:

```
BEGIN_MESSAGE_MAP(CMyWindow, CWnd)
    //{{AFX_MSG_MAP(CMainFrame)
        // NOTE - the ClassWizard will add and remove mapping macros here.
        // DO NOT EDIT what you see in these blocks of generated code!
        ...
        ON_MESSAGE(WM_PASSIVEX,                        OnPassiveX)
        ...
END_MESSAGE_MAP( )
``` the window of the control, such as perform any drawing or UI handling that is desired. As can be appreciated, subclassing the control's window in this manner allows the drawing code 64 to exist in the client base 60. The OnPassiveX function is set forth below:

```
LONG CMyWindow::OnPassiveX(WPARAM wp, LPARAM lp)
{
    REPORT_TYPE   rptt = (RPTT)LOWORD(wp);
    REPORT_SUB    rptsub = (RPTSUB)HIWORD(wp);
    HWND          hwnd = (HWND)lp;
    CWndChart**   ppwndChart = NULL;
    // Check for the magic nmnbers that the control is going away
    if (rptt == PASSIVEX_DESTROY_TYPE && rptsub == PASSIVEX_DESTROY_SUB)
    {
        // Do any clean up here
        return TRUE;
    }
    if (rptt == rptTypeA && rptsub == rptSubA)
    {
        ppwndChart = &m_pwndChartA;
    }
    else if (rptt == rptTypeB && rptsub == rptSubB)
        ...
    else
    {
        Assert(FALSE);
    }
    if (ppwndChart != NULL)
    {
        RECT   rect;
        // Create the chart window object
        *ppwndChart = new CWndChart;
        (*ppwndChart)->SubclassWindow(hwnd);
        // Make it redraw itself
        (*ppwndChart)->Invalidate( );
    }
    return TRUE;
}
```

Figure 5:
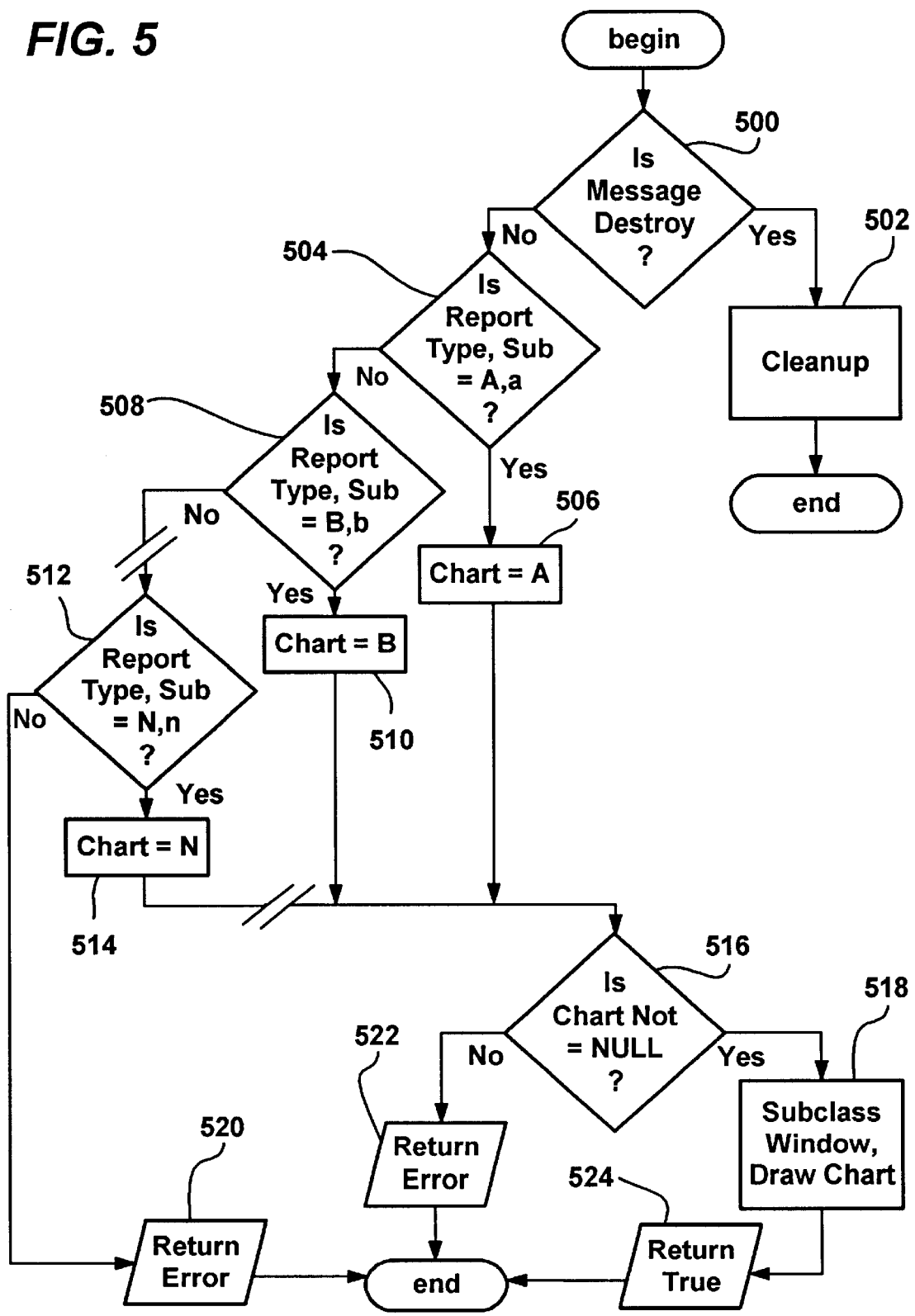
FIG. 5 is a flow diagram generally representing the steps taken on the client side to control a control instantiated by a browser.

As part of setting up the message map, the client (dialog box 70₂) executes the OnPassiveX function, which first extracts the parameters passed thereto, including the ReportType, ReportSub and the control's window handle. In the present example, the parameters are used to draw a report, however as can be readily appreciated, the parameters may be used for other purposes as determined by the client, since the client originated those parameters. In any event, once the data is used for its intended purpose, e.g., to determine the appropriate report type, a window object (CWndChart) is created and the control's window subclassed. Subclassing is a known operation (see, e.g., the aforementioned reference "Programming Windows 95"), and is not discussed hereinafter, except to point out that by subclassing the window, the client code (CWndChart) now may perform any function in A general explanation of the OnPassiveX function is also described with reference to FIG. 5, beginning at step 500, which, (after the parameters are extracted from the message), tests if the message is a destroy-type message as determined by the values of the PASSIVEX paremeters. If the message is a destroy message, step 500 branches to step 502 where any desired cleanup is performed by the client, e.g., objects instantiated by the client are destroyed and the process ends.

If the message was not a destroy message, steps 504–512 are provided to hook up the appropriate report type with the control 62₃, as specified by the parameters. Note that any number of controls may be on the page 68, and thus steps 504–512 match the proper control with the appropriate report. Further, note that if no match is found, an error message or the like is provided via step 520.

Assuming a report (e.g., chart) has been specified for the control, step 516 is executed, which tests that the chart is not NULL. If NULL, an error or the like is provided via step 522. Conversely, if not NULL, step 518 is executed to subclass the control's window and draw the chart, while step 524 provides a "True" return. Note that FIG. 3, step 308, also represents the subclassing and drawing steps of the present invention.

As can be seen from the foregoing detailed description, there is provided a method and system that enable client-side control of a control loaded by a browser. The method and system are cost-effective, reliable, extensible and simple to implement.

While the invention is susceptible to various modifications and alternative constructions, a certain illustrated embodiment thereof is shown in the drawings and has been described above in detail. It should be understood, however, that there is no intention to limit the invention to the specific form disclosed, but on the contrary, the intention is to cover all modifications, alternative constructions, and equivalents falling within the spirit and scope of the invention.

What is claimed is:

1. In a computer system, a method of controlling a control instantiated via a page rendering mechanism from a client application, comprising, creating a page associated with the client application, the page including the control, the client application invoking the page rendering mechanism to instantiate the page including instantiating the control, locating at the control a client window of the client application, sending a control window handle to the client window, and subclassing the control window via the control window handle to provide client application output in the control window via the client window of the application without having the page rendering mechanism render the application output.

2. The method of claim 1 further comprising performing an operation in the control window from the client window.

3. The method of claim 2 wherein providing output in the control window via the client window of the application comprises drawing in the control window.

4. The method of claim 1 wherein creating a page at the client includes creating a client application dialog box.

5. The method of claim 1 wherein the page is an HTML page and the page rendering mechanism is a browser, and wherein instantiating the control includes the step of instructing the browser to navigate to the page.

6. The method of claim 1 wherein locating at the control a client window comprises determining at least one higher parent window of the control window.

7. The method of claim 1 wherein locating at the control a client window comprises determining at least one higher parent window of the control window and sending a message to thereto, and evaluating a result of sending the message.

8. The method of claim 7 wherein the client window is a dialog box, and further comprising determining a class of a parent window, testing the class to determine if the parent window corresponds to a dialog box, and if so, sending the message thereto, and if not, obtaining a new parent window of the parent window.

9. A computer-readable medium having computer-executable instructions for performing the method of claim 1.

10. The method of claim 1 wherein the client application hosts the page rendering mechanism.

11. In a computer system including a client application having a client window, a mechanism comprising, a control, a page associated with the client application and including the control, a page rendering mechanism, the client application invoking the page rendering mechanism and instructing the page rendering mechanism to render the page, the page rendering mechanism instantiating the control in response thereto, the control having a control window and communicating a control window handle to the client window, and the client window subclassing the control window via the control window handle to provide application output in the control window via the client window of the application without having the page rendering mechanism render the application output.

12. The mechanism of claim 11 wherein the page rendering mechanism is a browser.

13. The mechanism of claim 11 wherein the page is an HTML page.

14. The mechanism of claim 11 wherein the client application includes drawing code, and wherein the client window uses the drawing code to draw in the control window.

15. The mechanism of claim 11 wherein the client window comprises a dialog box.

16. The mechanism of claim 11 wherein the client application hosts the page rendering mechanism.

17. The mechanism of claim 11 wherein the client application instructs the page rendering mechanism to render the page by requesting the page rendering mechanism to navigate to the page.

18. A computer-readable medium having computer-executable instructions, comprising:
 executing a client application having a client window associated therewith;
 providing a page associated with the client application, the page including a control therein;
 invoking a page rendering mechanism at the client application;
 rendering the page via the page rendering mechanism, including instantiating the control such that the control has a control window and control window handle associated therewith;
 sending the control window handle of the control window to the client window; and
 subclassing the control window via the control window handle to provide application output from the client application to the control window without having the page rendering mechanism render the application output.

19. The computer-readable medium of claim 18 having further computer-executable instructions comprising, locating the client window by walking up a chain of parent windows from the control window.

20. The computer-readable medium of claim 19 wherein locating the client window includes sending a message including a value therein for handshaking.

21. The computer-readable medium of claim 19 wherein the client window is a dialog box, and wherein locating the client window includes determining whether a parent window is a dialog box.

22. The computer-readable medium of claim 18 having further computer-executable instructions for passing parameters from the control window to the client window.

23. The computer-readable medium of claim 22 wherein at least one of the parameters identifies the control to the client window.

24. The computer-readable medium of claim 18 wherein the client application hosts the page rendering mechanism.

* * * * *